Nov. 27, 1923.                  H. G. GUNDLACH                  1,475,264
                                  TOOL FOR CALKING
                                  Filed May 15, 1923
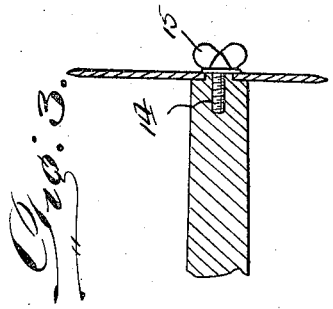
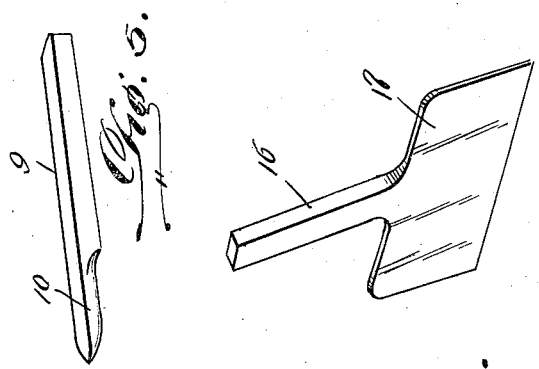
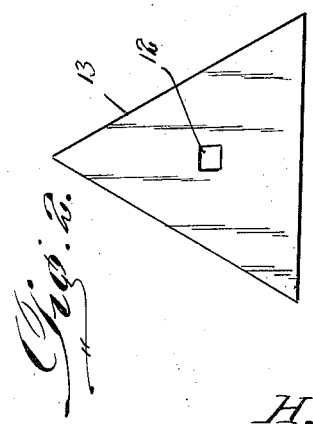

Patented Nov. 27, 1923.

1,475,264

UNITED STATES PATENT OFFICE.

HENRY G. GUNDLACH, OF BROOKLYN, NEW YORK.

TOOL FOR CALKING.

Application filed May 15, 1923. Serial No. 639,067.

*To all whom it may concern:*

Be it known that HENRY G. GUNDLACH, a citizen of the United States, residing at Brooklyn, in the county of Kings and State of New York, has invented certain new and useful Improvements in Tools for Calking, of which the following is a specification.

This invention has reference to a tool for pulling calking for scraping the deck being finished and for other purposes.

The invention comprises an elongated handle with a passage therethrough at one end to hold the hook for pulling the calking and with a square terminal at the other end to retain a seam scraper.

The invention will be best understood from a consideration of the following detail description taken in connection with the accompanying drawings forming part of this specification with the understanding, however, that the invention is not confined to any strict conformity with the showing in the drawings but may be changed and modified so long as such changes and modifications mark no material departure from the salient features of the invention as expressed in the appended claim.

In the drawings:

Figure 1 is a side elevation partly in section of a tool embodying the invention;

Figure 2 is a plan view of a triangular scraper blade;

Figure 3 is a section of one end of the tool with the scraper blade applied;

Figure 4 is a perspective view of another form of scraper blade; and

Figure 5 is a perspective view of a deck scraper arranged to fit in the groove provided for the calking puller.

Referring to the drawings, there is shown a handle 1 of elongated shape of generally round contour in cross section. The handle 1 is enlarged at one end in a head 2 diagonally through which there is provided a passage 3 of rectangular cross section intersecting another passage 4 about one-half way of the length of the passage 3 and this passage 4 is screw threaded to seat a thumb screw 5 provided with a head 6 for its manipulation. The passage 3 is shaped to seat a bar 7 of similar shape terminating at one end in a hook extension 8 designed to enter the calking groove to facilitate the pulling of the calking.

For insertion in the passage 3 there is provided another bar 9 of square contour for a portion of its length and terminating in a straight extension 10, the bar 9 constituting a seam scraper and having its extension 10 partially round in cross section.

At the end of the main blade 1 is a squared projection 11 to receive a square perforation 12 through one end of a triangular scraper blade 13 by means of which decks or the like may be scraped as needful. Fitted to a threaded perforation 14 through the squared projection 11 is a thumb clamp screw 15 by means of which a scraper blade 13 may be made fast to the handle 1.

Also adapted to fit in the passage 3 is a squared handle 16 and said handle may be secured therein by the thumb screw 5 whereby a flat head 17 on one end of the handle 16 may be utilized as a scraper in place of the scraper blade 13. The rounded enlargement 2 at the end of the tool serves as a bearing or fulcrum adapted to rest against the side of a ship when using the device, and may be used in driving calks into place.

What is claimed is:

A tool of the character described comprising a handle, a rounded and upwardly extending enlargement formed on the handle and provided with an angularly disposed rectangular bore, a tool shank received into the bore, the head being also provided with a threaded angularly disposed opening communicating with the bore, and a screw in the opening and engaging the shank.

In testimony whereof I affix my signature.

HENRY G. GUNDLACH.